Sept. 13, 1966　　　　　W. D. MILLER　　　　3,273,038
BATTERY RECHARGING METHOD AND APPARATUS FOR
ELECTRICALLY POWERED VEHICLES
Filed April 8, 1963　　　　　　　　　　　2 Sheets-Sheet 1
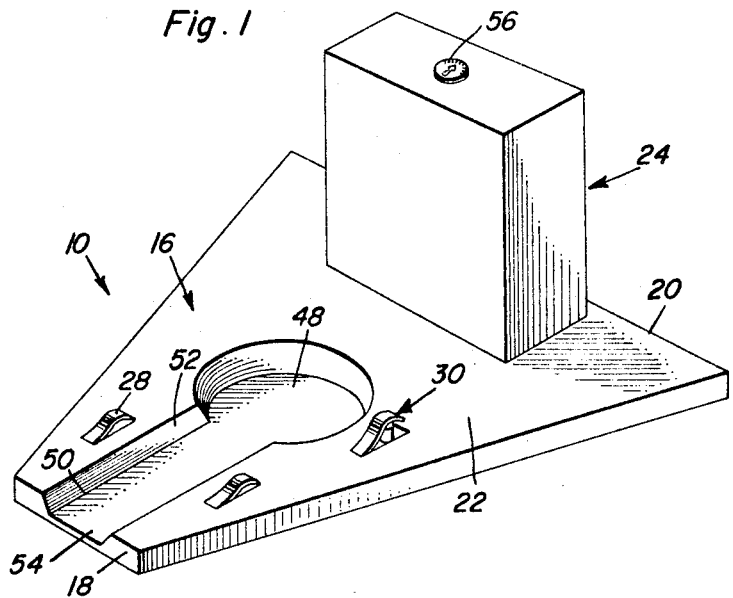
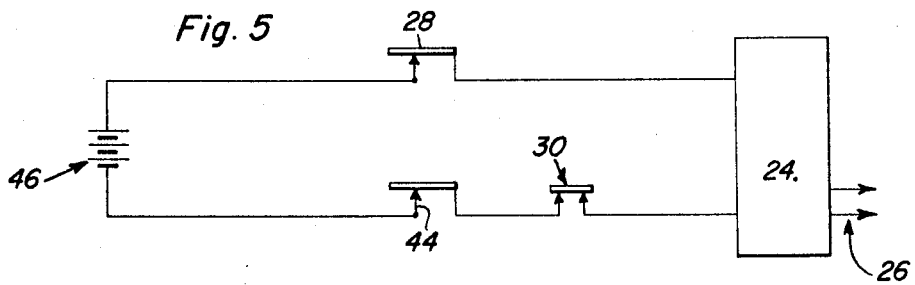
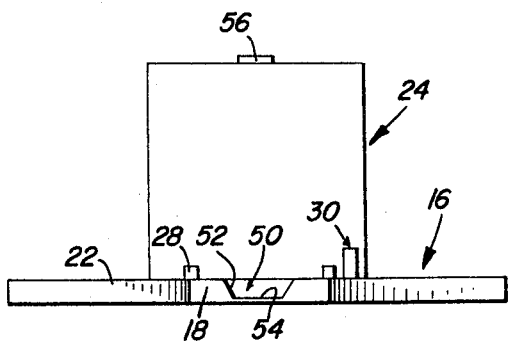
Walter D. Miller
INVENTOR.

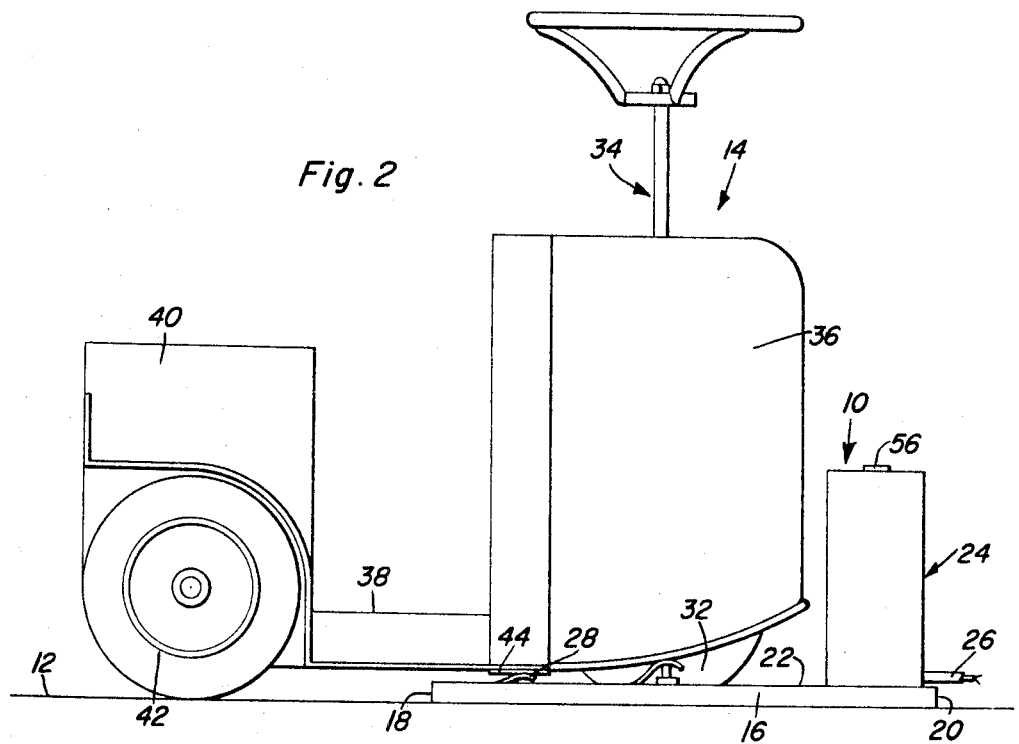
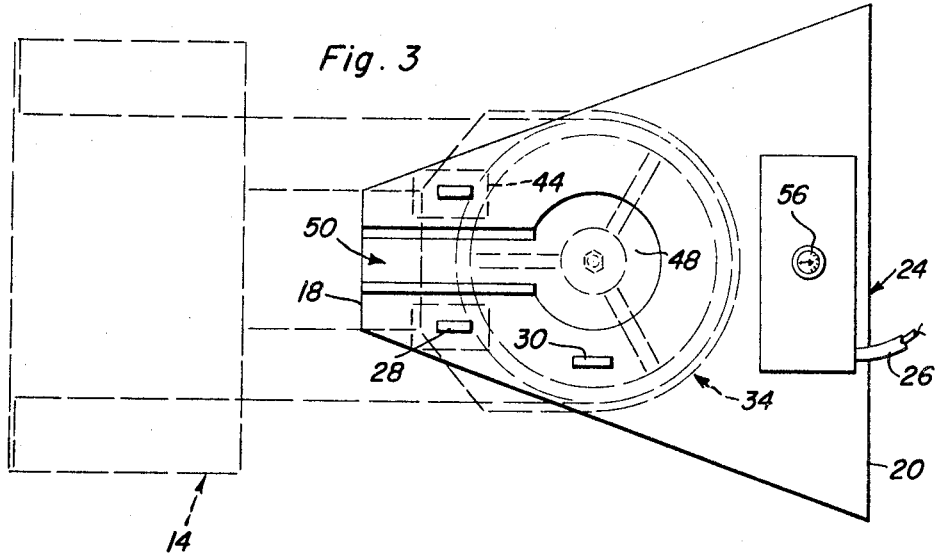

United States Patent Office 3,273,038
Patented Sept. 13, 1966

3,273,038
BATTERY RECHARGING METHOD AND APPARATUS FOR ELECTRICALLY POWERED VEHICLES
Walter D. Miller, % Mt. Jefferson Lumber Co., Lyons, Oreg.
Filed Apr. 8, 1963, Ser. No. 271,101
4 Claims. (Cl. 320—2)

This invention relates to a vehicle with a rechargeable electric power source therein, and more particularly to a method of recharging this power source and to apparatus whereby such recharging is readily performed.

Exemplary of the vehicles to which this invention pertains are electrically-powered vehicles including a rechargeable battery system which supplies power for operating the vehicle. Such vehicles commonly are used in industrial work where the employment of other types of power units, such as internal combustion engines, is not feasible. The invention is described herein in connection with a scooter-type vehicle including a forward dirigible wheel for steering, although it should be understood that by so describing the invention it is not intended to be limited in all respects to such vehicles, as certain features relate to steerable vehicles as a class.

The apparatus of the present invention considerably simplifies and speeds up the process of recharging the battery or batteries in a battery system of a vehicle. By facilitating the recharging of the battery system, the apparatus makes practicable the use of battery-powered vehicles in operations where to date such vehicles have not found widespread use.

Therefore, a primary object of the invention is to provide apparatus especially constructed to facilitate the charging of the battery system of a vehicle.

Another object of the invention is to provide novel apparatus featuring a battery charging stand, that may be employed to charge the battery system of a plurality of vehicles, the stand being such that a vehicle may be driven directly into the stand and placed in condition to receive a charge by the act of becoming positioned in the stand.

In a specific embodiment of the invention, and where the same is adapted for the charging of a vehicle with a dirigible wheel, the charging stand may comprise a floor-mounted member or platform providing a guiding trough within which is received the dirigible wheel. The vehicle may roll into place, with its dirigible wheel rolled over the floor-mounted member and into a limit position, whence the wheel may be angularly displaced so as to indicate to the operator of the vehicle that the limit position has been reached, such angular displacement also serving to prevent withdrawal of the vehicle. The platform within which the guide trough is formed may also be provided with a set of projecting charging contacts, that engage a complementing set of contacts on the vehicle so as to establish an electrical connection between the two sets of contacts. Also part of the charging stand is a switch mechanism mounted on the platform so as to be actuated by the vehicle when the vehicle is in its limit position which switch mechanism, when actuated, completes an electrical circuit between the battery system of the vehicle and a supply of electrical energy used for charging.

These, together with other objects and advantages, will become more fully apparent as the following description is read in conjunction with the accompanying drawings, wherein:

FIGURE 1 is a perspective view of the battery charging station formed by the apparatus of the present invention.

FIGURE 2 is a side elevational view of the apparatus with a vehicle for which it is designed, in a charging position.

FIGURE 3 is a top plan view of the apparatus with the vehicle shown in dotted lines.

FIGURE 4 is a front elevational view of the apparatus.

FIGURE 5 is a simplified electrical circuit diagram associated with the apparatus and vehicle of the present invention.

Referring now to the drawings in detail, it will be observed that the structure generally referred to by reference numeral 10 defines a battery charging station adapted to be positioned at any location on a floor 12 in order to service a relatively small or scooter-type of industrial vehicle generally referred to by reference numeral 14. The structure 10 includes the floor mounted platform member generally referred to by reference numeral 16 which as shown in the drawings, is trapezoidal in shape having a forward receiving end 18 and a rear end 20. The platform member 16 rests on the floor or any other supporting surface 12 and has a top surface 22. Mounted on the top surface adjacent the rear end 20, is a battery charging circuit device generally referred to by reference numeral 24. The charging device 24 is a commercially available item the details of which do not in themselves form part of the present invention. The charging device 24 is therefore operatively connected to any available source of electrical power through the electrical cable 26 that extends rearwardly therefrom. Electrical conductors therefore extend from the charging device 24 within the platform member 22 to a pair of spring-biased contact elements 28 which project above the top surface 22 of the platform member 16. Also mounted by the platform member and projecting above the top surface thereof, is the actuator of a limit switch device 30.

The platform member 16 provides guiding facilities for the vehicle 14. It will be observed that the vehicle 14 includes a forward dirigible wheel 32 that may also be the electrically powered drive wheel. A steering wheel assembly 34 is therefore operatively connected to the dirigible wheel 32 for angular displacement thereof about a vertical axis in order to guide movement of the vehicle. The dirigible wheel 32 therefore projects below the forward portion 36 of the vehicle within which the drive mechanism and battery source of power may be located. An intermediate platform portion 38 is provided on the vehicle for the vehicle operator while the rear portion 40 of the vehicle disposed above a pair of wheel assemblies 42, may provide seating as well as storage facilities. The vehicle battery may therefore be provided with contact terminal elements 44 electrically connected to the terminals of the battery and exposed below the vehicle for engagement by the contact elements 28 in order to establish electrical connections between the battery of the vehicle and the charging device 24. Referring therefore to FIGURE 5, it will be observed that the vehicle battery 46 is electrically connected to the contact terminal elements 44 so that they may be engaged by the contact elements 28 which in turn are electrically connected to the charging device 24 for supply of charging current to the battery 46. The charging device is however activated upon closure of the limit switch 30 which is electrically disposed between one of the contact elements 28 and the charging device 24 as hereinbefore indicated. It will however be appreciated, that in order to obtain the electrical contact between the contact elements 28 and 44 as well as closure of the limit switch device 30, the vehicle must be properly positioned at the charging station as illustrated in FIGURES 2 and 3. Thus, it will be observed that when the vehicle is in its charging position, the battery contact elements 44 will be in contact engagement with the contact elements 28 while the bottom of the vehicle will engage the limit switch device 30.

Guiding facilities are therefore provided on the platform member 16 so that the operator may easily and properly move the vehicle into a battery charging position. Accordingly, an enlarged circular depression 48 is formed intermediate the forward and rear ends of the platform member and is of such a diameter or dimension as to accommodate angular displacement of the dirigible wheel 32 as well as to limit forward movement of the vehicle to the charging position spaced from the charging device 24. The circular depression 48 is therefore formed at one end of an elongated guiding trough 50 which extends between the circular depression 48 and the forward receiving end 18 of the platform member. The guiding trough 50 is therefore of a width sufficient to receive the dirigible wheel 32 and thereby guide movement of the vehicle in a forward direction into the circular depression 48. The side walls 52 of the trough therefore converge downwardly toward a thin bottom portion 52 so that as the dirigible wheel 32 moves over the bottom portion of the guiding trough into the circular depression 48, the weight of the vehicle will firmly anchor the structure 10 to the floor by the weight of the vehicle. When the vehicle arrives at its charging position, the dirigible wheel 32 will be within the circular depression so that the vehicle operator may detect whether the vehicle is in the charging position by being able to angularly displace the dirigible wheel. In doing so, unintentional withdrawal of the vehicle from the charging position will be prevented. It will therefore be apparent, that the limit switch device 30 and the contact elements 28 exposed above the top surface 22 of the platform member will be fixedly located with respect to the guiding facilities including the circular depression 48 and the guiding trough 50 so as to be engaged by the proper portions of the vehicle as hereinbefore indicated. Thus, the vehicle battery will be recharged automatically by the charging device 24 and removed when the batteries are fully recharged as indicated on the indicator mechanism 56 of the charging device 24.

From the foregoing description, the construction of the apparatus and its utility in connection with the charging method of the present invention, will be apparent. It will therefore be appreciated, that the charging system of the present invention will be effective to eliminate human error and reduce time spent by operating personnel in connection with the charging of the battery sources of power of electrically operated vehicle. The charging system also permits the use of the highly maneuverable vehicles aforementioned which need not be burdened with battery charging circuit equipment nor require the services of personnel in establishing electrical connections for charging purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an electrically-powered wheel-supported vehicle having a dirigible wheel and a rechargeable battery source of power, a battery recharging apparatus comprising a platform having guiding means thereon for receiving a vehicle wheel rolled onto said platform and then positioning the wheel thus to define a charging station for the vehicle, said guiding means having an elongated trough formed in the platform for guiding movement of said dirigible wheel and a circular depression formed in the platform at a forward end of the trough permitting angular displacement of said dirigible wheel with the vehicle in said charging station, charging circuit means mounted on said platform in spaced relation to the guiding means for providing charging current for the battery source of power of the vehicle, contact means mounted on said platform in fixed relation to said guiding means for engagement with the vehicle to establish electrical contact between the battery source of power and said charging circuit means, said vehicle having contact elements connected to the battery source of power and exposed below the vehicle for engagement by the contact means, and means operatively mounted on the platform operative in response to forward movement of the vehicle onto the platform into said charging station for rendering the charging circuit means operative.

2. For use with a vehicle having a rechargeable battery and a dirigible wheel for guiding movement thereof, a battery charging stand comprising a floor mounted member having a top surface extending between a forward receiving end and a rear end, said top surface being formed intermediate the forward and rear ends with an enlarged circular depression for accommodating angular movement of the dirigible wheel and a guiding trough extending from said forward end to the depression for guiding movement of the dirigible wheel into the depression, limit switch means mounted on the member for actuation by the vehicle when the wheel thereof is in said depression and contact means mounted on said member and exposed above the top surface thereof for engagement by the vehicle.

3. The combination of
    a vehicle having wheels including at least one operator-steered dirigible wheel for directing the course of the vehicle, a rechargeable electric power source for powering movement of the vehicle, and a set of electrical charging contacts exposed on the outside of the vehicle electrically connected to said power source,
    a surface supporting the wheels of the vehicle over which the vehicle may be steered while moving,
    guiding means for receiving a wheel of the vehicle onto which the vehicle wheel may be steered, defining on receiving such wheel a predetermined position of the vehicle relative to said surface, and
    charging circuit means including a second set of spaced electrical contacts adapted to be supplied with electrical energy for making contact with said first set of contacts with the vehicle in said predetermined position, and switch means for making and breaking a circuit between a supply of electrical energy and said second set of contacts, said switch means being positioned relative to said second set of contacts to be in position to be actuated by the vehicle to make said circuit on the vehicle occupying said predetermined position as defined by said guiding means.

4. The combination of claim 3, wherein said guiding means comprises a platform which includes a guide trough having a bottom portion over which the dirigible wheel moves to anchor firmly the platform in place by the weight of the vehicle.

References Cited by the Examiner

UNITED STATES PATENTS 3,067,373 12/1962 Hopt et al. _____ 320—2

FOREIGN PATENTS 565,134 10/1958 Canada.

JOHN F. COUCH, *Primary Examiner.*

LLOYD McCOLLUM, *Examiner.*

S. WEINBERG, *Assistant Examiner.*